Oct. 15, 1940.  B. R. BENJAMIN  2,217,887
TRACTOR IMPLEMENT
Filed Oct. 8, 1938  2 Sheets-Sheet 1

Inventor
Bert R. Benjamin
By V. F. Lassagne
Att'y.

Oct. 15, 1940.   B. R. BENJAMIN   2,217,887
TRACTOR IMPLEMENT
Filed Oct. 8, 1938   2 Sheets-Sheet 2

Inventor
Bert R. Benjamin
By V. F. Lasseigne
Att'y.

Patented Oct. 15, 1940

2,217,887

UNITED STATES PATENT OFFICE 2,217,887

TRACTOR IMPLEMENT

Bert R. Benjamin, Oak Park, Ill., assignor to International Harvester Company, a corporation of New Jersey Application October 8, 1938, Serial No. 233,986

7 Claims. (Cl. 97—47)

This invention relates to implements adapted for use with tractors and more particularly to the type of implement which is partly supported on the tractor and partly supported on a steerable supporting means on the implement itself.

In this type of implement, the forward portion of a tool-carrying frame is connected to the tractor for lateral or swinging movement as well as for vertical adjustment. When it is desired to vertically adjust the implement to and from its ground-working position, the adjustment is made of the tool-carrying frame about the steerable supporting means on the rear portion of the tool-carrying frame. The steerable supporting means is connected with the tractor steering mechanism, so that any steering movement of the tractor is imparted to the implement steerable means to make for effective control of the tractor with the implement attached thereto. When the arrangement is proceeding directly across the field being worked upon, the implement with respect to the tractor is easily controllable, the rear supporting wheel of the implement being effective to keep the implement alined with the tractor. Where considerable turn of the tractor steering mechanism is effected, as upon backing or upon turning, there is a tendency for the implement steerable wheel to become ineffective to keep the implement alined with the tractor, thereby placing undue strains upon the connections of the implement with the tractor. In fact, with the arrangements heretofore, complete control of the arrangement is lost.

It is, therefore, the main object of the present invention to provide controls for this type of implement to give the best effect of the implement steerable means at all times.

According to the present invention there has been provided an automatic means for making the implement carrying frame, which is normally free to swing laterally, rigid with the tractor upon raising the implement from its ground-working position, so that the implement steering means virtually becomes in effect a part of the steering mechanism of the tractor. With the tool-carrying frame rigid, there is no tendency for the implement to slide from one side to the other and there is eliminated the possibility of the steerable rear furrow wheel becoming ineffective upon backing and turning. This means is associated with the lifting mechanism on the tractor, which is, in turn, connected to the implement and is operative upon vertical adjustment of the implement from its ground position to its transport position.

There is also further control means accessible to the operator and associated with the connecting means between the tractor steering mechanism and the implement steering mechanism by which the operator can manually regulate the amount of steering of the steerable implement wheel for a given movement of the tractor steering mechanism. Both of these controls make for more effective steering of the arrangement by the implement steerable means.

For a better understanding of the invention, reference may be had to the following detailed description taken in connection with the accompanying drawings, in which.

Figures 1, 4:
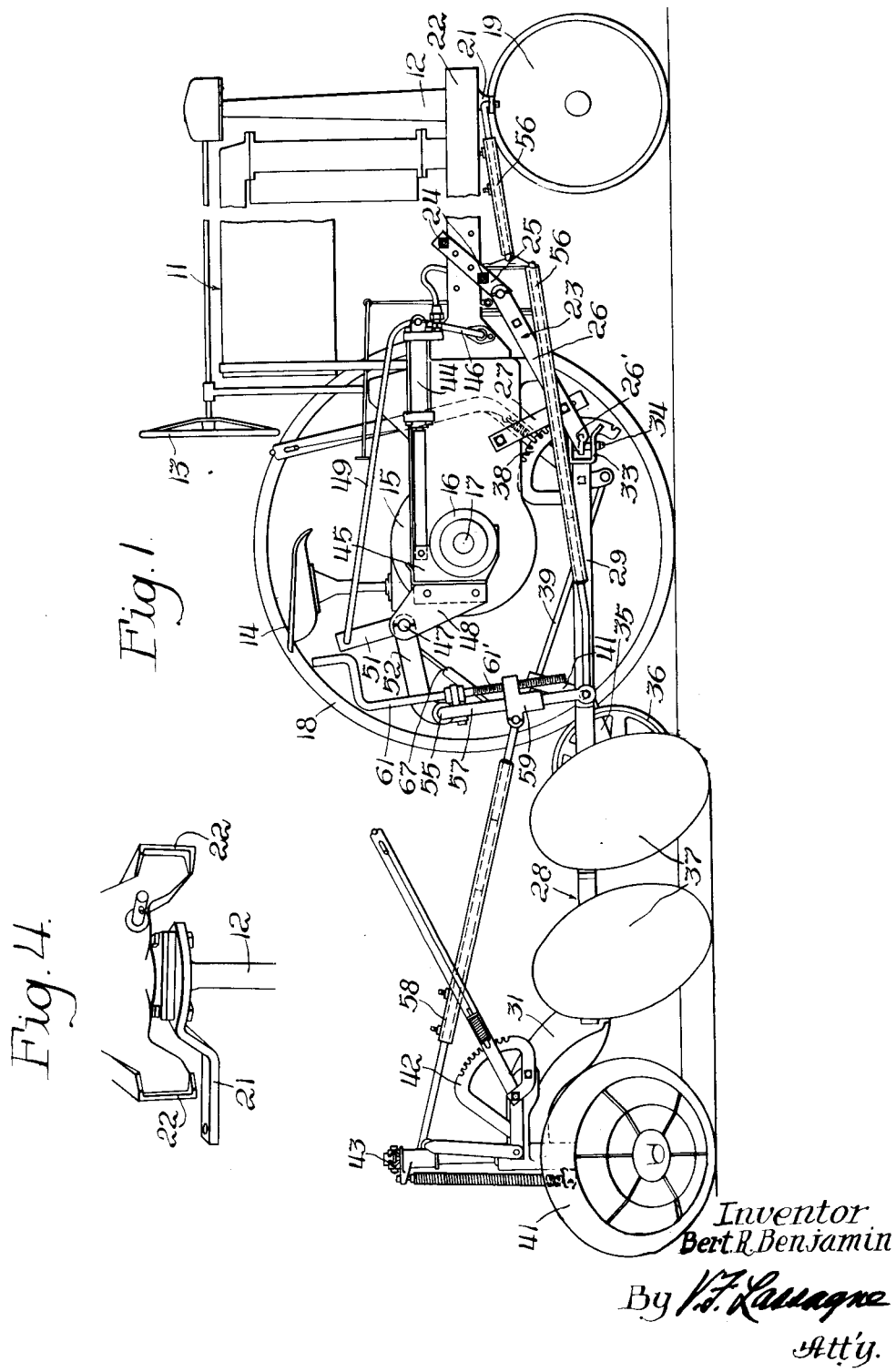
Figure 1 is a side elevational view of a tractor with its right rear wheel removed and with the implement embodying the features of the present invention attached thereto.
Figure 2:
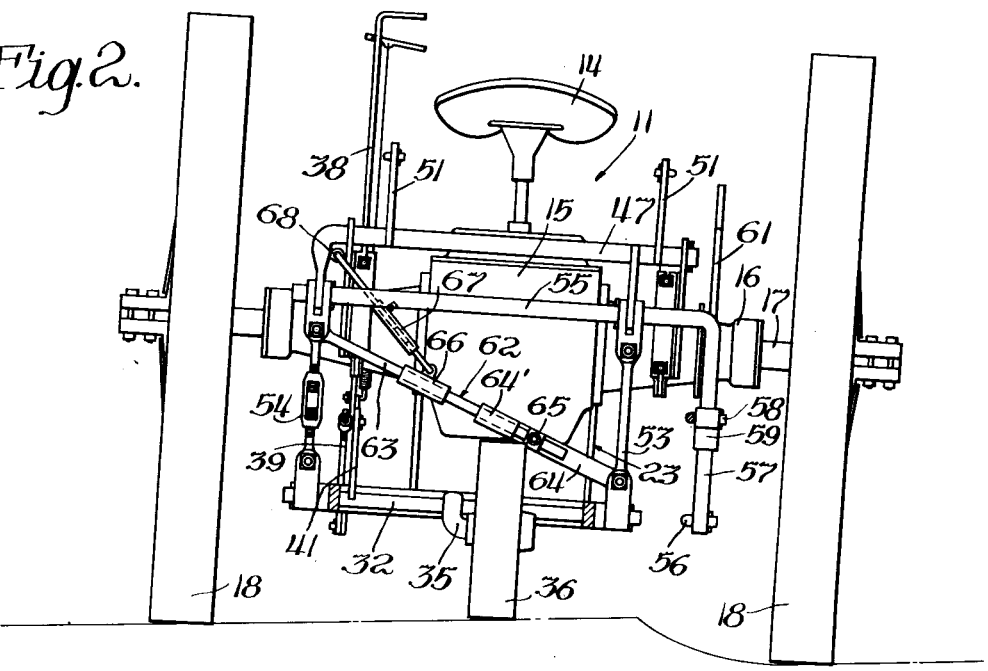
Figure 2 is a rear elevational view of the tractor with one wheel in the furrow and showing that portion of the implement having one of the features of the present invention.
Figure 3:
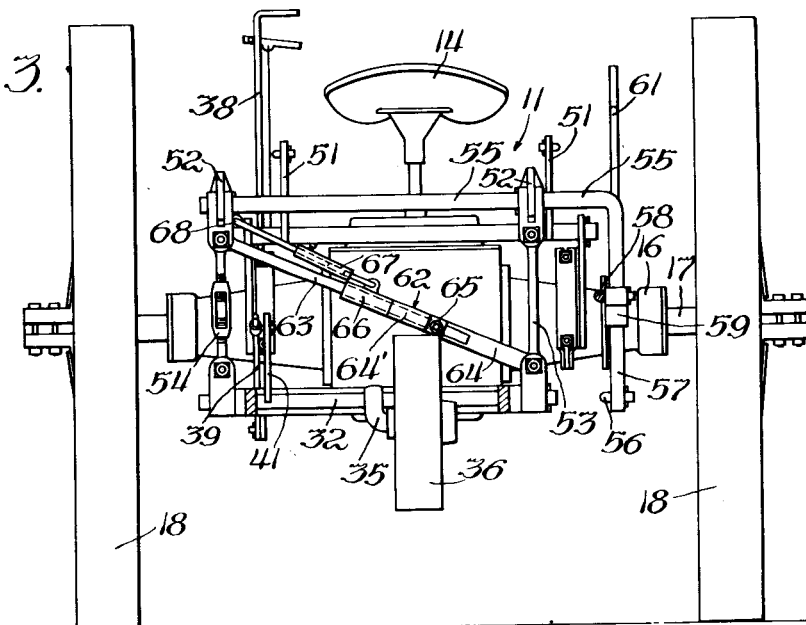
Figure 3 is a similar view to Figure 2 with the implement in its raised position and illustrating the working of the feature making for rigidity of the implement with the tractor; and, Figure 4 is a detailed showing of a portion of the tractor steering mechanism at the point of attachment of the steering connections of the implement thereto.

Referring to the figures, there is shown a tractor designated generally at 11, having a forward steering mechanism 12 operated by a steering wheel 13 from the operator's station 14 located on the transmission and differential housing 15 and a rear axle housing 16, through which the rear axle 17 connects with the rear tractor wheels 18. The forward steering mechanism also includes dirigible steering wheels 19 and a laterally projecting arm 21 turnable with the mechanism, the function of which will be described later.

The tractor 11 also has side sills 22 to which is attached a draw-bar means 23 by means of hook bolts 24 and comprising two portions 25 and 26 angled with respect to each other to provide its point of connection 26' for the implement well located on the tractor and there maintained by straps 27 connected to the transmission and differential housing 15. The implement is designated generally at 28 and comprises a draft frame 29 and a tool-carrying frame 31 pivotally connected to the draft frame by means of a rotatable shaft 32 for swinging movement with respect thereto. The draft frame 29 has a U-shaped portion 33 adapted to fit about the point of connection 26' of the draw-bar 26 and to be detachably connected thereto for lateral movement by means of a vertically extending connecting pin 34. The rotatable shaft 32 is in effect a part of the draft frame and has an arm 35 connected thereto and a gauge wheel 36 for regulating the depth of cut of working tools 37 on the tool-carrying frame 31. This shaft is rotated to effect adjustment of the gauge wheel 36 by manual adjusting means 38 carried on the forward portion of the draft frame 29 and connected by means of a rod 39 to an arm 41 of the rotatable shaft 32 to rotatably adjust the same.

The tool-carrying frame 31 has a rear steerable wheel supporting means 41, about which the tool-carrying frame 31 may be adjusted, and associated with the same there is a manual adjusting means 42 for raising the rear end of the tool-carrying frame 31 with respect to the wheel, when desired. The steerable means has a laterally projected arm 43 for the purpose of effecting steering of the means.

Mounted on the tractor is a power lifting cylinder 44 supported at one end to quick attachable plates 45 on the rear axle housing 16 and at its other end to a pivotal link 46. Fluid is supplied to this cylindrical unit by means not shown, causing the same to elongate and effecting rotation of a rock-shaft 47, which is carried in a bracket 48 quickly attached to the quick attachable plates 45 on the rear axle housing 16 in the well known manner, by means of a connecting link 49 extending from the forward end of the unit 44 to an arm 51 rigid with the rock-shaft 47. On the rock-shaft 47 are over-hanging arms 52, to which swivel links 53 and 54 are connected by means of a second rotatable shaft 55 located substantially above the rotatable shaft 32 of the draft frame 29. By means of these swivel links, substantially free swinging or lateral movement of the frame with respect to the tractor is permitted, the links being connected to the rotatable shaft 32 for supporting the implement frames. This movement, while the tractor is proceeding in a straight line direction, has no serious effect upon the effectiveness of the implement steering means 41, and hence the steering means 41 may readily keep the implement alined with the tractor.

As means for connecting the implement steerable means 41 with the tractor steering mechanism 12, there is provided an adjustable linkage means 56 for connecting the arm 21 of the tractor steering mechanism 12 with a downwardly depending pivot arm or pivotal means 57 forming a part of the shaft 55 and an adjustable linkage means 58 connected with the arm 43 of the steerable means 41 and to the pivotal means 57 at a location other than the point of connection of the adjustable link 56 therewith.

In accordance with the present invention, this point of connection is made by means of a slidable member 59, which is manually actuable from the operator's station 14 by means of a vertically extending hand crank 61 carried by the pivotal means 57 and turnable to effect adjustment of the slide by means of a screw portion 61' thereof toward and away from the point of connection of the adjustable link 56 to the pivotal means 57 at its lower end. In another sense, this pivotal means provides means for supporting the connecting means positioned intermediate of the tractor steering mechanism and the implement steerable means.

By having one of the linkage means connecting the pivotal means 57 adjustable, an adjustment of steering of the steerable means 41 relative to a given movement of the tractor steering mechanism 12 is provided and the steerable means 41 can readily be alined as desired with the steerable wheels 19, depending upon the nature of the tools being used as well as upon the ground being worked. It may be desired in some instances to have the wheel 41 set to one side or the other of the tractor steering wheels 19 depending upon the nature of the land being worked or upon the type of tools being used, all of which can be effected by this adjustable linkage. For best operation of the arrangement under normal conditions, it is well to have the implement steerable means 41 turn only between, say, 60 and 80 per cent. of the amount of turn of the steering wheels 19. If it is desired to decrease this amount, it is accomplished by adjusting the point of connection of the link 58 to a point on the pivotal means 57 nearer to the point of pivot of the same than the point of connection of the link 56 therewith. If it is desired to increase this amount, the point of connection of the link 58 is moved away from the point of pivot of the pivotal means and nearer to the point of pivot of the point of connection of the link 56 therewith. Further, it is most desirable that this adjustment can be readily made while the arrangement is being operated. Thus, in accordance with the present invention, manual actuating means accessible to the operator's station, including the crank 61 and slide 59, has been provided. For instance, the operator may be working the arrangement on a side hill at which time a greater amount of turning of the implement steering means 41 is desired in order to keep the working tool 37 well into the land and to maintain the desired width of cut thereof. By adjusting the slide 59 downardly toward the point of connection of the connecting means 56 with the pivot means, a greater angling of the wheel 41 will be obtained for a given amount of steering of the tractor steering wheels 19 to keep the implement well upon the side hill, the tractor wheels 19 being kept angled while working on a side hill. Also, for turning or backing of the tractor, it is more desirable to have the slide 59 adjusted for greater angling of the wheel 41 to get the greater effect thereof and thus to make it possible to turn the tractor in less time and space than would be possible otherwise. But for level and straight going of the implement and the tractor, the less response of the wheel 41 through the tractor steering mechanism 12, the better the results obtained. Hence, by the present invention there has been provided means for readily obtaining adjustment of the steerable wheel means 41 of the implement.

Associated with the swivel links 53 and 54 and extending diagonally with relation thereto, there is provided means 62 whereby the amount of swinging of the implement in its ground-working position relative to the tractor may be adjusted. This means comprises two relatively slidable members 63 and 64 having connected therewith adjustable stop members 65 and 66, respectively, adapted to engage with the ends of a sleeve portion 64' of the slidable member 64. The adjustable stop member 65 consists of a collar and a tightening screw, while the stop member 66 consists of a sleeve and adjustable on the slidable member 63 by an extensible link 67 connecting the member 66 with an eye-bolt 68 located on one of the overhanging arms 52 of the rock-shaft 47 near to its point of pivot. This eye-bolt is connected close enough to the axis of the rock-shaft 47, so that, upon raising the implement, it will have very little movement about the axis thereof and will be relatively stationary with respect to movement of the swivel links 53 and 54. When the implement is raised, the sleeve 66 will thus remain substantially stationary and the slidable member 63 will slide upwardly therethrough, so that the lower end of the sleeve 66 will abut the end of the sleeve portion 64' of the slidable member 64 and cause the same to contact with the adjustable stop member 65, thereby making the means 62 a substantially rigid member, permitting of no swinging movement of the implement frame in a lateral direction in its raised position. This is all effected automatically by the raising of the implement, and the implement frame will now be held rigid with the tractor, so that ease of turning of the wheel 41 may be obtained for backing and turning of the tractor. Without this control, little control of the implement steering wheel was obtained upon backing and turning of the tractor. Undue strains were placed on the connections of the implements to the tractor and the tendency was to bring the implement against the tractor wheels, and as a result the apparatus was damaged.

It should now be seen that in accordance with the present invention control means have been provided for the best operation of an implement of the steerable wheel type which may be readily turned or backed with minimum effort, making in effect a more efficient apparatus.

While various changes in the detailed construction of this arrangement may be apparent, it will be understood that such changes shall be within the spirit and scope of the present invention as defined in the appended claims.

What is claimed is:

1. In combination, a tractor, an implement attachment of the type having a steerable means and connected to the tractor for lateral movement and for vertical adjustment, means for vertically adjusting the implement from one position to another position, and means responsive to the vertical adjustment means for prohibiting lateral movement of the implement when adjusted to one of its positions.

2. In combination, a tractor, an implement attachment of the type having a steerable supporting means, means for connecting the implement to the tractor for lateral movement and for vertical adjustment, means for raising and lowering the implement about its steerable supporting means, and automatic means for making the implement attachment substantially rigid with the tractor upon raising the implement, whereby the steerable means will be rendered more effective for backing up and for turning of the tractor with the implement attached.

3. In combination, a tractor having a steering mechanism, an implement attachment of the type having a steerable supporting means for operation by the tractor steering mechanism and connected to the tractor for lateral movement and for vertical adjustment, means for raising and lowering the implement about the steerable supporting means, and automatic means for making the implement attachment rigid with the tractor upon raising the implement to thereby render the steerable supporting means more effective at times of backing up and upon turning of the tractor with the implement attached.

4. In combination, a tractor, an implement attachment of the type having a steerable supporting means, means for connecting the implement to the tractor for swinging movement and for vertical adjustment, means for adjusting the amount of swinging movement of the implement in its ground-working position, means for raising and lowering the implement about its steerable supporting means, and means associated with said adjusting means for making the implement rigid with the tractor upon raising the implement whereby the implement steerable means will be rendered more effective for backing and turning of the tractor with the implement attached.

5. In combination, a tractor, an implement attachment of the type having a steerable supporting means, means for connecting the implement to the tractor for swinging movement and for vertical adjustment, means associated with the connecting means for adjusting the amount of swinging movement of the implement in its ground working position, means for raising and lowering the implement about its steerable supporting means, and means associated with the adjustable means for making the implement rigid with the tractor upon raising of the implement, whereby the implement steerable means will be rendered more effective for backing and for turning of the tractor with the implement attached.

6. In combination, a tractor, an implement attachment of the type having a steerable supporting means, means for connecting the implement to the tractor for swinging movement and for vertical adjustment, means for raising and lowering the implement about its steerable supporting means, means for adjusting the amount of swinging movement of the implement in its ground-working position associated with the raising and lowering means comprising relatively slidable members, adjustable stop members on one of the slidable members, and means associated with one of the stop members to keep the same in its adjusted position but permitting sliding movement of the slidable member upon raising the implement to make the adjusting means rigid and to prohibit swinging movement of the implement, whereby the implement steerable means will be rendered more effective for backing and for turning of the tractor with the implement attached.

7. In combination, a tractor having a steering mechanism, an implement attachment of the type having a steerable supporting means and connected to the tractor for lateral movement relative thereto, a pivot arm means positioned intermediate the tractor steering mechanism and the implement steerable means, linkage means for connecting the tractor steering mechanism to the pivot arm means at one location thereon, linkage means for connecting the implement steerable means to the pivot arm means at another location thereon, one of said connecting means including a manually adjustable member on said arm to alter the distance between the locations of connections to the pivot arm of the respective connecting means whereby the amount of steering of the implement steerable means relative to a given movement of the tractor steering mechanism is controlled.

BERT R. BENJAMIN.